United States Patent
Weijnen et al.

(10) Patent No.: US 10,077,353 B2
(45) Date of Patent: Sep. 18, 2018

(54) DRIER COMPOSITION AND USE THEREOF

(75) Inventors: John Weijnen, Alphen aan den Rijn (NL); Martin Bloem, Noordwijkerhout (NL); Dirk Klomp, Wormerveer (NL)

(73) Assignee: PPG Europe BV, Uithoorn (NL)

( * ) Notice: Subject to any disclaimer, the term of this patent is extended or adjusted under 35 U.S.C. 154(b) by 633 days.

(21) Appl. No.: 13/994,308

(22) PCT Filed: Dec. 15, 2010

(86) PCT No.: PCT/EP2010/069691
§ 371 (c)(1),
(2), (4) Date: Jun. 14, 2013

(87) PCT Pub. No.: WO2012/079624
PCT Pub. Date: Jun. 21, 2012

(65) Prior Publication Data
US 2013/0274386 A1    Oct. 17, 2013

(51) Int. Cl.
| | |
|---|---|
| *C09F 9/00* | (2006.01) |
| *C08K 5/3462* | (2006.01) |
| *C09D 167/08* | (2006.01) |
| *C08K 5/3432* | (2006.01) |
| *C08K 5/3467* | (2006.01) |
| *C08K 5/00* | (2006.01) |
| *C08K 5/098* | (2006.01) |
| *C08K 5/16* | (2006.01) |

(52) U.S. Cl.
CPC .......... *C08K 5/3462* (2013.01); *C08K 5/3432* (2013.01); *C08K 5/3467* (2013.01); *C09D 167/08* (2013.01); *C09F 9/00* (2013.01); *C08K 5/0091* (2013.01); *C08K 5/098* (2013.01); *C08K 5/16* (2013.01)

(58) Field of Classification Search
CPC .... C08K 5/0091; C08K 5/098; C08K 5/3462; C08K 5/16; C08K 5/3467; C08K 5/3432; C09D 167/08; C09F 9/00
See application file for complete search history.

(56) References Cited

U.S. PATENT DOCUMENTS

| | | | |
|---|---|---|---|
| 4,311,625 A | 1/1982 | Bellettiere et al. | |
| 5,039,740 A * | 8/1991 | Anderson | C09D 167/08 525/7 |
| 5,154,764 A * | 10/1992 | Cells | C09F 9/00 106/252 |
| 8,013,044 B2 * | 9/2011 | Hage et al. | 524/83 |

FOREIGN PATENT DOCUMENTS

| | | |
|---|---|---|
| EP | 1382648 A1 | 1/2004 |
| EP | 1772502 A1 | 4/2007 |
| WO | 03093384 A1 | 11/2003 |
| WO | 2008003492 A1 | 1/2008 |
| WO | 2010054461 A1 | 5/2010 |

* cited by examiner

*Primary Examiner* — Robert T Butcher
(74) *Attorney, Agent, or Firm* — Krisanne Shideler

(57) ABSTRACT

The invention relates to a drier composition for an oxidatively air-drying alkyd based coating composition, comprising: a) at least one metal complex comprising a metal and at least one nitrogen donor ligand, wherein the metal is selected from the group consisting of Fe and Mn, and wherein said at least nitrogen donor ligand is selected from the group comprising monodentate, bidentate, tridentate, tetradentate, pentadentate and hexadentate nitrogen donor ligands; and b) at least one K salt of an organic acid. The present invention also relates to a coating composition comprising said drier composition and the use thereof.

11 Claims, No Drawings

DRIER COMPOSITION AND USE THEREOF

CROSS-REFERENCE TO RELATED APPLICATIONS

This application is the U.S. National Phase under 35 U.S.C. § 371 of International Application PCT/EP2010/069691, filed Dec. 15, 2010.

FIELD OF THE INVENTION

The invention relates to a drier system for a coating composition, preferably for an autoxidizable alkyd based coating composition.

BACKGROUND OF THE INVENTION

Architectural, air-drying coating compositions such as paints, lacquers and varnishes commonly comprise three main components: an autoxidizable binder polymer, which is the film-forming component, a solvent, which is the carrier for the non-volatile components, and driers or siccatives, which influence the drying speed of the composition. Autoxidizable binder polymers can be dissolved in an organic solvent such as white spirit or hydrogenated white spirit. Alternatively, autoxidizable binder polymers can be dispersed in water.

Autoxidizable alkyd resins are long-established binder polymers for film-forming coating compositions acknowledged for their esthetic properties, low surface tension (which enables the wetting of and adhesion on a wide variety of substrates and facilitates pigment wetting), applicability by various techniques, and cost-effectiveness. Because of these properties, alkyd resins are the most widely used air drying binders in coating compositions. Autoxidizable alkyd resins comprise drying or semi-drying unsaturated fatty acids or oils, which are generally attached to the polyester backbone of polyols and polycarboxylic acids. When the coating composition is applied to a substrate, the drying process starts by solvent evaporation and the binder polymers undergo autoxidation and subsequently form cross-links between the polymer chains resulting in a solid and coherently dried film. The drying process of autoxidizable architectural coating compositions takes place at ambient temperatures ranging from 0 to 40° C., whereby the presence of oxygen is essential. Since the drying process proceeds slowly, the chemical conversion of alkyd resins is habitually catalyzed by salts of metal ions as catalytic oil drying agents. These salts of metal ions act as driers or siccatives.

These metal salts, containing either alkaline-earth metals or heavy metals, affect the autoxidation of the binder with air and/or catalyze cross-linking of the unsaturated sites. The drying time can consequently be reduced from days to hours. The presence of efficient driers is therefore essential for the drying of air-drying coating compositions.

These catalytic oil drying agents are commonly divided into three main classes according to their catalytic activity: primary driers, which all possess significant catalytic activity, coordination driers, which promote the film-forming process by bridging two or multiple polymer chains, and secondary driers, which have little to no catalytic effect when used on their own but assist the drying process by activating the metal in the primary drier. A wide range of metals can form the basis of these driers, examples include but are not limited to cobalt (Co), manganese (Mn), iron (Fe), vanadium (V), cerium (Ce), zirconium (Zr), lanthanum (La), neodymium (Nd), aluminum (Al), bismuth (Bi), strontium (Sr), zinc (Zn), lithium (Li), calcium (Ca), potassium (K), barium (Ba) and lead (Pb). The metal salt ligands can also play an important role in drying speed: drying accelerators are organic ligands that are able to increase the activity of primary drier metals causing a more rapid drying of the coating film.

Primary driers (also called top driers, surface driers or oxidation driers), promote the top-down hardening of a liquid alkyd resin. The mode of action of the primary driers in the autoxidative curing process is deactivation of natural occurring anti-oxidants, oxygen uptake, peroxide formation and peroxide decomposition. Primary driers are characterized by having at least two accessible valence states which allows catalytic hydroperoxide decomposition and regeneration of the active species. Examples of primary driers are cobalt (Co), cerium (Ce), lead (Pb), iron (Fe), manganese (Mn) and vanadium (V) carboxylates. To enhance homogeneous through drying of a coating film, primary driers are frequently used in combination with secondary and coordination driers.

Coordination driers, also referred to synonymously as through driers, promote the film-forming process by interaction with the carboxyl and hydroxyl groups in the polymeric binder. This way, coordination driers can bridge two or more polymer chains. These carboxyl and hydroxyl groups may be initially present in the binder molecule or formed during the autoxidation process. This group comprises the metal driers based on zirconium (Zr), strontium (Sr), aluminum (Al), bismuth (Bi), lanthanum (La), and neodymium (Nd).

Secondary driers are also referred to synonymously as auxiliary driers. These metal driers exist in a single oxidation state and are not catalytically active by themselves. However, secondary driers do affect the rate-of-dry by interacting with the primary driers. Secondary driers include calcium (Ca), barium (Ba), potassium (K) and lithium (Li) metal soaps.

To improve the appearance and quality of the coating film and to accelerate the drying time, in a typical alkyd formulation the primary drier is combined with auxiliary driers such as zirconium (Zr), strontium (Sr), aluminum (Al) (as disclosed in EP0148636), neodymium (Nd) (as disclosed in U.S. Pat. No. 5,154,764) and bismuth (Bi) (as disclosed in U.S. Pat. No. 4,331,575) and secondary driers such as calcium (Ca), barium (Ba), lithium (Li) and potassium (K) (as disclosed in U.S. Pat. No. 4,311,625).

K-octoate is known to activate Co-based driers but because of its hydrophilic character this drier is mainly used in aqueous coating formulations.

The most widely used primary driers are cobalt carboxylates because of their good drying performance at ambient temperature and coloristic properties. However, they will most likely be restricted in the near future because of regulation issues.

Hence there is an increasing demand for alternative, non-cobalt based driers. Alternative driers are based on vanadium (V) (as disclosed in WO2009007288), manganese (Mn) (as disclosed in EP1382648), a combination of cerium (Ce) and manganese (Mn) (as disclosed in EP1394230) and iron (Fe) (as disclosed in WO03/093384). However these alternative driers are not as active as cobalt driers and are generally colored. Recently developed curing agents for air-drying alkyd resins based on iron or manganese complexes (as disclosed in WO2008003652 and US2009253833) show a highly efficient drying behavior under ambient conditions. However, the curing agents based on iron or manganese complexes do not show a comparable drying activity to cobalt salts under conditions of low temperatures or do not show a comparable activity with regards to through hardening.

Thus, there exists a need to improve the drying performance of non-cobalt primary drier compositions.

SUMMARY OF THE INVENTION

The inventors have surprisingly found that effective drying of alkyd compositions can be achieved by combining iron- and manganese ligand complexes with potassium carboxylates. Especially at low temperatures (5° C.) a significant reduction in drying time was surprisingly observed.

The present invention provides novel drier combinations suitable for oxidatively air-drying alkyd based coating formulations, which show a drying activity comparable to cobalt based driers. The present invention additionally provides alkyd-based coating compositions that comprise the aforementioned novel drier combinations.

The present invention relates to a drier composition suitable for an autoxidizable alkyd based coating composition, comprising:

a) at least one metal complex comprising a metal and at least one nitrogen donor ligand, wherein the metal is selected from the group consisting of Fe and Mn, and wherein said nitrogen donor ligand is selected from the group comprising monodentate, bidentate, tridentate, tetradentate, pentadentate and hexadentate nitrogen donor ligands; and b) at least one K salt of an organic acid.

The present invention also relates to the use of the drier composition in an autoxidizable alkyd based coating composition.

The present invention also relates to a coating composition, comprising:

a) at least one autoxidizable alkyd based binder; and b) the drier composition according to the present invention.

The present invention also relates to use of the coating composition according to the present invention in a varnish, lacquer, paint, stain, varnishes, enamels, printing ink or floor covering. The present invention also relates to a substrate having applied thereon a coating composition according to the present invention.

Preferred embodiments of the invention are disclosed in the detailed description and appended claims. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

When describing the compositions of the invention, the terms used are to be construed in accordance with the following definitions, unless a context dictates otherwise.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

As used in the specification and the appended claims, the singular forms "a", "an," and "the" include plural referents unless the context clearly dictates otherwise. By way of example, "a binder" means one binder or more than one binder.

Unless defined otherwise, all technical and scientific terms used herein have the same meaning as is commonly understood by one of skill in the art. All publications referenced herein are incorporated by reference thereto.

Throughout this application, the term 'about' is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

The present invention provides a drier composition for an oxidatively air-drying alkyd based coating composition, comprising:

a) at least one metal complex comprising a metal and at least one nitrogen donor ligand, wherein the metal is selected from the group consisting of Fe and Mn, and wherein said at least one nitrogen donor ligand is selected from the group comprising monodentate, bidentate, tridentate, tetradentate, pentadentate and hexadentate nitrogen donor ligands; and b) at least one K salt of an organic acid.

As used herein, the terms "drier" (which are also referred to synonymously as "siccatives" when in solution) refer to organometallic compounds that are soluble in organic solvents and binders. They are added to unsaturated oils and binders in order to appreciably reduce their drying times, i.e. the transition of their films to the solid phase. Driers are available either as solids or in solution. Suitable solvents are organic solvents and binders. The driers are present in amounts expressed as weight percent of the metal based on the weight of binder solids (or resin) unless stated otherwise.

As used herein, the term "drier composition" refers to the mixture of driers as presently claimed. The drier composition according to the invention comprises several drier compounds. The inventors have found that the present selection of driers in a coating composition improves the drying speed of the coating composition.

According to an embodiment of the invention, the present drier composition comprises at least one metal complex selected from an iron (Fe) or manganese (Mn) complex of a monodentate, bidentate, tridentate, tetradentate, pentadentate or hexadentate nitrogen donor ligand, and at least one drier being a K salt of an organic acid.

Preferably, the at least one metal complex is a Fe or Mn complex of a bidentate, tridentate, tetradentate, pentadentate or hexadentate nitrogen donor ligand.

Preferably the iron ion is selected from Fe(II) and Fe(III) and the manganese ion is selected from Mn(II), Mn(III) and Mn (IV).

Preferably the ligand L is present in one or more of the forms [MnLCl$_2$], [FeLCl$_2$]; [FeLCl]Cl; [FeL(H$_2$O)](PF$_6$)$_2$: [FeL]Cl$_2$, [FeLCl]PF$_6$ and [FeL(H$_2$O)](BF$_4$)$_2$. Preferably the ligand L is present in one or more of the form [MnLCl$_2$], [FeLCl$_2$]; [FeLCl]Cl; [FeL]Cl$_2$ and [FeL(H$_2$O)](BF$_4$)$_2$.

As used herein the term "nitrogen-donor ligand" or "ligand" or "L" is an organic structure or molecule which will support coordinating nitrogen atoms. In the present invention, said at least one nitrogen-donor ligand is selected from the group comprising monodentate, bidentate, tridentate, tetradentate, pentadentate and hexadentate nitrogen donor ligands. For suitable non-limiting examples of monodentate, bidentate, tridentate, tetradentate, pentadentate and hexadentate nitrogen donor ligands reference is made to U.S. Pat. No. 2,526,718, U.S. Pat. No. 2,565,897, U.S. Pat. No. 4,311,625, WO 2008/003652 and DE 4032546, the entirety of each of which are hereby incorporated by reference.

Preferably the iron or manganese complex is of a tridentate, tetradentate or pentadentate nitrogen donor ligand. More preferably the iron complex comprises a pentadentate nitrogen donor ligand and the manganese complex comprises a tridentate or a tetradentate nitrogen donor ligand.

The following are preferred classes of driers that are iron or manganese complexes of tridentate, tetradentate, pentadentate or hexadentate nitrogen donor ligands, N-heterocyclic compounds and N-hetero-aromatics.

In a preferred embodiment, said at least one nitrogen donor ligand is selected from the group comprising ligands of formula (I), (II), (III), (IV), (V), (VI), (VII), N-heterocyclic compounds and N-hetero-aromatics,

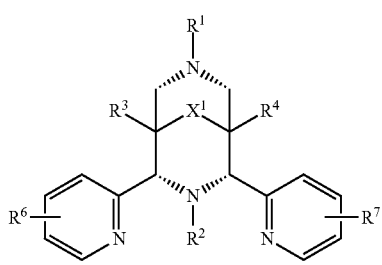
(I)

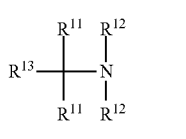
(II)

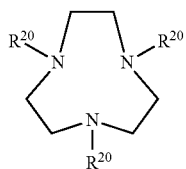
(III)

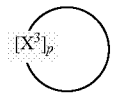
(IV)

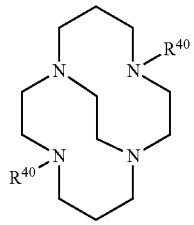
(V)

$(R^{50})_2N\text{—}X^4\text{—}N(R^{50})_2;$ (VI)

$N(R^{60})_3;$ (VII)

The ligands of formula (I) belong to the bispidon class, which are preferably in the form of iron metal complex,

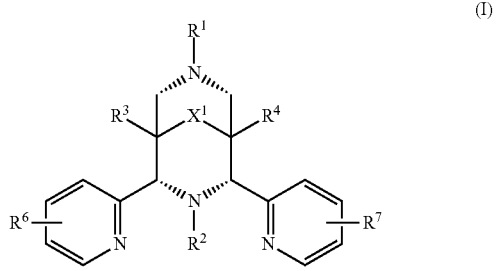
(I)

wherein $R^1$ and $R^2$ are independently selected from the group consisting of $C_{1-24}$alkyl, $C_{6-10}$aryl, heteroaryl, heteroaryl$C_{1-6}$alkyl, and —CH$_2$—CH$_2$—N(CH$_3$)$_2$, wherein heteroaryl is selected from the group consisting of pyridyl, pyrazinyl, pyrazolyl, pyrrolyl, imidazolyl, benzimidazolyl, pyrimidinyl, triazolyl and thiazolyl;

$R^3$ and $R^4$ are independently selected from the group consisting of —H, $C_{1-8}$alkyl, $C_{1-8}$alkyl-O—$C_{1-8}$alkyl, $C_{1-8}$alkyl-O—$C_{6-10}$aryl, $C_{6-10}$aryl, $C_{1-8}$-hydroxyalkyl, and —(CH$_2$)$_m$C(O)OR$^5$;

$R^5$ is selected from —H or $C_{1-4}$alkyl, m is an integer selected from 0 to 4;

each $R^6$ and $R^7$ are independently selected from the group consisting of —H, —F, —Cl, —Br, —OH, $C_{1-4}$alkoxy, —NH—C(O)—H, —NH—C(O)—$C_{1-4}$alkyl, —NH$_2$, —NH—$C_{1-4}$alkyl, and $C_{1-4}$alkyl;

$X^1$ is selected from —C(O)— or —[C(R$^8$)$_2$]$_n$— wherein n is an integer selected from 0 to 3, and each $R^8$ is independently selected from the group consisting of —H, —OH, $C_{1-4}$alkoxy and $C_{1-4}$alkyl;

Preferably $R^3$ and $R^4$ are selected from —C(O)—O—CH$_3$, —C(O)—O—CH$_2$—CH$_3$, —C(O)—O—CH$_2$—C$_6$H$_5$ and CH$_2$OH.

Preferably the heteroatom capable of coordinating to a transition metal is pyridine-2-ylmethyl optionally substituted by $C_{1-4}$alkyl.

Preferably $X^1$ is C═O.

Preferred groups for $R^1$ and $R^2$ are CH$_3$, —C$_2$H$_5$, —C$_3$H$_7$, benzyl, —C$_4$H$_9$, —C$_6$H$_{13}$, —C$_8$H$_{17}$, —C$_{12}$H$_{25}$, and —C$_{18}$H$_{37}$, —CH$_2$-pyridyl, and pyridin-2-yl. A preferred class of bispidon is one in which at least one of $R^1$ or $R^2$ is pyridin-2-ylmethyl or benzyl, preferably pyridin-2-ylmethyl. More preferably, $R^1$ is pyridin-2-ylmethyl and $R^2$ is methyl.

A preferred bispidon is dimethyl 2,4-di-(2-pyridyl)-3-methyl-7-(pyridin-2-ylmethyl)-3,7-diaza-bicyclo[3.3.1]nonan-9-one-1,5-dicarboxylate (N2py3o-Cl) and the iron complex thereof. FeN2py3o-Cl which can be prepared as described in WO 02/48301. Other preferred bispidons are one in which instead of having a methyl group at the 3 position have longer alkyl chains, namely isobutyl, (n-hexyl) C6, (n-octyl) C8, (n-dodecyl) C12, (n-tetradecyl) C14, (n-octadecyl) C18, which were prepared in an analogous manner. Preferred tetradentate bispidons are also described in WO00/60045 and preferred pentadentate bispidons are described in WO02/48301 and WO03/104379 the entirety of each of which are hereby incorporated by reference.

The ligand of formula (II) is also referred as "N4py type ligand", which are preferably in the form of iron metal complex,

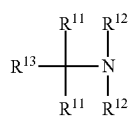
(II)

wherein $R^{11}$ and $R^{12}$ are each independently a group of formula $—R^{14}-R^{15}$;

$R^{13}$ is selected from the group consisting of —H, —$R^{14}$-$R^{15}$, and an optionally substituted group selected from the group consisting of $C_{1-6}$alkyl, $C_{6-10}$aryl and $C_{6-10}$aryl-$C_{1-6}$alkyl;

each $R^{14}$ is independently selected from a single covalent bond or an optionally substituted group selected from the group consisting of $C_{1-6}$alkylene, $C_{2-6}$alkenylene, $C_{1-6}$alkyleneoxy, amino$C_{1-6}$alkylene, $C_{2-6}$alkylene ether, carboxylic ester and carboxylic amide; and, each $R^{15}$ is independently selected from an optionally N-substituted aminoalkyl group or an optionally substituted heteroaryl group selected from the group consisting of pyridyl, pyrazinyl, pyrazolyl, pyrrolyl, imidazolyl, benzimidazolyl, pyrimidinyl, triazolyl and thiazolyl.

Preferably $R^{11}$ represents pyridin-2-yl or $R^{12}$ represents pyridin-2-yl-methyl. Preferably $R^{12}$ or $R^{11}$ represents 2-amino-ethyl, 2-(N-(m)ethyl)amino-ethyl or 2-(N,N-di(m)ethyl)amino-ethyl. If substituted, $R^{15}$ preferably represents 3-methylpyridin-2-yl. $R^{13}$ preferably represents hydrogen, benzyl or methyl.

The preferred ligands are N4Py (i.e. N,N-bis(pyridin-2-yl-methyl)-bis(pyridin-2-yl) methylamine) as described in WO95/34628 and MeN4py (i.e. N,N-bis(pyridin-2-yl-methyl-1,1-bis(pyridin-2-yl)-1-aminoethane, as described in EP0909809 the entirety of each of which are hereby incorporated by reference.

The ligand of formula (III) is also referred as the TACN-Nx. The ligands possess the basic 1,4,7-triazacyclononane structure but have one or more pendent nitrogen groups that complex with the metal to provide a tetradentate, pentadentate or hexadentate ligand.

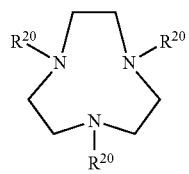
(III)

wherein each $R^{20}$ is independently selected from the group consisting of $C_{1-6}$alkyl, $C_{3-8}$cycloalkyl, heterocycloalkyl, heteroaryl, $C_{6-10}$aryl and $C_{6-10}$aryl-$C_{1-6}$alkyl, optionally substituted with a substituent selected from the group consisting of —OH, $C_{1-6}$alkoxy, phenoxy, carboxylate, carboxamide, carboxylic ester, sulfonate, amine, $C_{1-6}$alkylamine and —$N^+(R^{21})_3$;

each $R^{21}$ is selected from —H, $C_{1-6}$alkyl, $C_{2-6}$alkenyl, $C_{6-10}$aryl-$C_{1-6}$alkyl, $C_{6-10}$aryl-$C_{2-6}$ alkenyl, $C_{1-6}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and —$CX^2_2$—$R^{22}$;

each $X^2$ is independently selected from —H or $C_{1-3}$alkyl and wherein each $R^{22}$ is independently selected from an optionally substituted heteroaryl group selected from the group consisting of pyridyl, pyrazinyl, pyrazolyl, pyrrolyl, imidazolyl, benzimidazolyl, pyrimidinyl, triazolyl and thiazolyl; and, wherein at least one of $R^{21}$ is —$CX^2_2$—$R^{22}$.

Preferably $R^{22}$ is selected from optionally substituted pyridin-2-yl, imidazol-4-yl, pyrazol-1-yl, quinolin-2-yl groups. Most preferably $R^{22}$ is either a pyridin-2-yl or a quinolin-2-yl.

Preferably, the basic 1,4,7-triazacyclononane structure has two pendent nitrogen groups that complex with the transition metal (TACN-N2).

The ligands of formula (IV) are cyclam and cross bridged ligands, which are preferably in the form of a manganese metal complex;

(IV)

wherein each $X^3$ is independently selected from

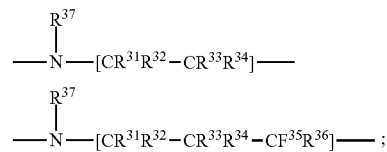

p is 4;

each $R^{37}$ is independently selected from the group consisting of —H, $C_{1-6}$alkyl, —$CH_2CH_2OH$, pyridin-2-ylmethyl and —$CH_2C(O)OH$; and, each $R^{31}$, $R^{32}$, $R^{33}$, $R^{34}$, $R^{35}$ and $R^{36}$ are independently selected from: —H, —$C_{1-4}$alkyl and $C_{1-4}$-hydroxyalkyl;

Preferred cyclam ligand are 1,4,8,11-tetraazacyclotetradecane (cyclam), 1,4,8,11-tetramethyl-1,4,8,11-tetraazacyclotetradecane(Me4cyclam), 1,4,7,10-tetraazacyclododecane (cyclen), 1,4,7,10-tetramethyl-1,4,7,10-tetraazacyclododecane (Me4cyclen), and 1,4,7,10-tetrakis(pyridine-2ylmethyl)-1,4,7,10-tetraazacyclododecane (Py4cyclen). With Py4cyclen the iron complex is preferred.

A preferred cross-bridged ligand is preferably of formula (V),

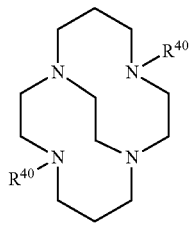

(V)

wherein each $R^{40}$ is independently selected from —H or a optionally substituted group selected from the group consisting of $C_{1-20}$alkyl, $C_{1-6}$alkyl-$C_{6-10}$aryl, $C_{2-6}$alkenyl or $C_{2-6}$-alkynyl; and all nitrogen atoms in the macropolycyclic rings are coordinated with the transition metal;

Preferably $R^{40}$ is methyl, which is the ligand 5,12-dimethyl-1,5,8,12-tetraaza-bicyclo [6.6.2]hexadecane of which the complex [Mn(Bcyclam)Cl$_2$] may be synthesized as described in WO 98/39098 the entirety of which is hereby incorporated by reference.

Other suitable crossed bridged ligands are also described in WO98/39098 the entirety of which is hereby incorporated by reference.

Ligands of formula (VI) are also referred as "trispicen-type" The trispicens are preferably in the form of an iron metal complex,

(VI)

wherein $X^4$ is selected from —CH$_2$CH$_2$—, —CH$_2$CH$_2$CH$_2$—, —CH$_2$C(OH)HCH$_2$—;

each $R^{50}$ is independently selected from the group consisting of —H, $C_{1-6}$alkyl, $C_{3-8}$cycloalkyl, heterocycloalkyl, heteroaryl, $C_{6-10}$aryl and $C_{6-10}$aryl-$C_{1-6}$alkyl, optionally substituted with a substituent selected from —OH, $C_{1-6}$alkoxy, phenoxy, carboxylate, carboxamide, carboxylic ester, sulfonate, amine, $C_{1-6}$alkylamine and —N$^+$(R$^{51}$)$_3$;

wherein each $R^{51}$ is selected from —H, $C_{1-6}$alkyl, $C_{2-6}$alkenyl, $C_{6-10}$aryl-$C_{1-6}$alkyl, $C_{6-10}$aryl-$C_{2-6}$alkenyl, $C_{1-6}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and —C(X$^5$)$_2$—R$^{52}$;

each $X^5$ is independently selected from —H or $C_{1-3}$alkyl and wherein each $R^{52}$ is independently selected from an optionally substituted heteroaryl group selected from the group consisting of pyridyl, pyrazinyl, pyrazolyl, pyrrolyl, imidazolyl, benzimidazolyl, pyrimidinyl, triazolyl and thiazolyl; and, at least two of $R^{50}$ are —C(X$^5$)$_2$—R$^{52}$.

The heteroatom donor group is preferably pyridinyl optionally substituted by —C$_{0-4}$alkyl.

Other preferred heteroatom donor groups are imidazol-2-yl, 1-methyl-imidazol-2-yl, 4-methyl-imidazol-2-yl, imidazol-4-yl, 2-methyl-imidazol-4-yl, 1-methyl-imidazol-4-yl, benzimidazol-2-yl and 1-methyl-benzimidazol-2-yl.

Preferably three of $R^{50}$ are C(X$^5$)$_2$—R$^{52}$.

The following are preferred trispicens: N-methyl-tris(pyridin-2-ylmethyl)ethylene-1,2-diamine; N-octyl-tris(pyridin-2-ylmethyl)ethylene-1,2-diamine; N-octadecyl-tris(pyridin-2-ylmethyl)ethylene-1,2-diamine; N-methyl-N,N',N'-tris(3-methyl-pyridin-2-ylmethyl) ethylene-1,2-diamine; N-ethyl-N,N',N'-tris(3-methyl-pyridin-2-ylmethyl)ethylene-1,2-diamine; N-methyl-N,N',N'-tris(5-methyl-pyridin-2-ylmethyl)ethylene-1,2-diamine; N-ethyl-N,N',N'-tris(5-methyl-pyridin-2-ylmethyl)ethylene-1,2-diamine; N-benzyl-N,N',N'-tris(3-methyl-pyridin-2-ylmethyl)ethylene-1,2-diamine; N-benzyl-N,N',N'-tris(5-methyl-pyridin-2-ylmethyl)ethylene-1,2-diamine; N-butyl-N,N',N'-tris(pyridin-2-ylmethyl)ethylene-1,2-diamine; N-octyl-N,N',N'-tris(pyridin-2-ylmethyl)ethylene-1,2-diamine; N-dodecyl-N,N',N'-tris(pyridin-2-ylmethyl)ethylene-1,2-diamine; N-octadecyl-N,N',N'-tris(pyridin-2-ylmethyl) ethylene-1,2-diamine; N-Methyl-N,N',N'-Tris(imidazol-2-ylmethyl)-ethylenediamine; N-ethyl-N,N',N'-Tris(imidazol-2-ylmethyl)-ethylenediamine; N,N'-dimethyl-N,N'-bis(imidazol-2-ylmethyl)-ethylenediamine; N-(1-propan-2-ol)-N,N',N'-Tris(imidazol-2-ylmethyl)-ethylenediamine; N-(1-propan-2-ol)-N,N',N'-Tris(1-methyl-imidazol-2-ylmethyl)-ethylenediamine; N,N-diethyl-N',N'',N'''-Tris(5-methyl-imidazol-4-ylmethyl)-diethylenetriamine; N-(3-propan-1-ol)-N,N',N'-Tris(1-methyl-imidazol-2-ylmethyl)-ethylenediamine; N-hexyl-N,N',N'-Tris(imidazol-2-ylmethyl)-ethylenediamine; N-methyl-N,N',N'-tris(benzimidazol-2-ylmethyl)-ethylenediamine; and, N-(3-propan-1-ol)methyl-N,N',N'-tris(benzimidazol-2-ylmethyl)-ethylenediamine. Other suitable trispicens are described in WO 02/077145.

Other suitable nitrogen donor ligands are ligands of formula (VII)

(VII)

wherein each $R^{60}$ is independently selected from the group consisting of —H, $C_{1-6}$alkyl, $C_{6-10}$aryl, $C_{1-6}$alkyl-$C_{6-10}$aryl and $C_{2-6}$alkenyl.

In a preferred embodiment, bispidon and TACN-Nx ligands are used.

Non-limiting examples of preferred nitrogen donor ligands are selected from the group comprising of the compounds of formula (XI), (XII), (XIII), (XIV), (XV),

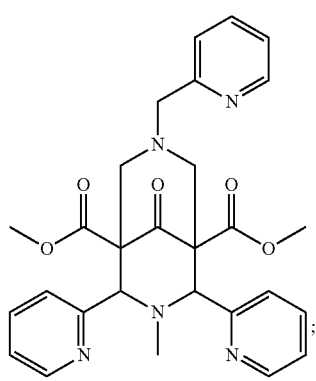

(XI)

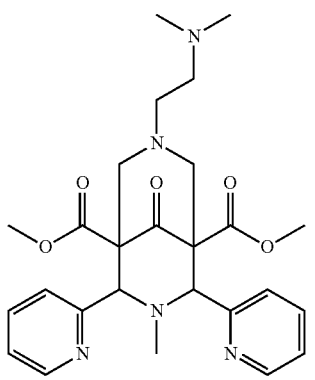

(XII)

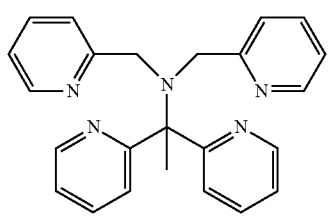

(XIV)

(XV)

Preferably, said iron complex is of formula (XX)

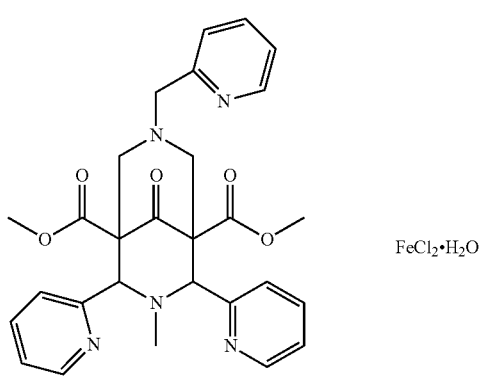

(XX)

and is also referred as the active ingredient of Borchi® Oxy Coat from OMG with CAS nr. 478945-46-9.

Preferably, said manganese complex is of formula (XXI)

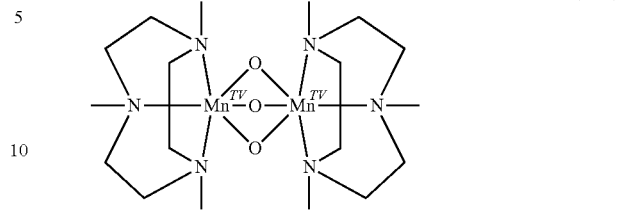

(XXI)

and is also referred as the active ingredient of Drycoat.

According to the invention, the drier composition also comprises at least potassium (K) salt of an organic acid. Preferably, the at least one K salt of an organic acid is a K-carboxylate.

Preferably, the organic acid of said at least one K salt of an organic acid is selected from branched-chain or straight-chain saturated and unsaturated aliphatic, aromatic and alicyclic monocarboxylic acids having 6 to 22 carbon atoms, cycloaliphatic monocarboxylic acids having 6 to 10 carbon atoms, or mixtures of these acids, preferably the organic acid is selected from the group comprising 2-ethylbutanoic acid, 2,2-dimethylpentanoic acid, 2-ethylpentanoic acid, 2-ethyl-4-methylpentanoic acid, 2-ethylhexanoic acid, isooctanoic acid, isononanoic acid, neononanoic acid, nonanoic acid, isodecanoic acid, neodecanoic acid, 2-ethyldecanoic acid, isotridecanoic acid, isotetradecanoic acid, n-hexanoic acid, n-octanoic acid, n-decanoic acid, n-dodecanoic acid, cyclopentanoic acid, methylcyclopentanoic acid, cyclohexanoic acid, methylcyclohexanoic acid, 1,2-dimethylcyclohexanoic acid, cycloheptanoic acid, myristic acid, stearic acid, arachidic acid, behenic acid, oleic acid, linoleic acid, tall oil fatty acid, erucic acid, p-tert-butylbenzoic acid, monobutyl maleate, monodecyl phthalate, naphthenic acid and mixtures thereof. Particularly preferred acids include 2-ethylhexanoic acid, isononanoic acid, isodecanoic acid, and mixtures thereof. Preferably said K salt of an organic acid is selected from the group comprising K-octoate, K-naphthenate and K-neodecanoate. More preferably, said K salt of an organic acid is K-octoate.

Suitable potassium (K) driers are available from the OM Group, Inc., and include Potassium Hex-Cem®.

In an embodiment of the present invention, the drier composition further comprises at least one other metal salt of an organic acid, wherein the metal is selected from the group comprising Co, Ca, Zr and Sr, preferably the metal is selected from the group comprising Co, Ca, and Zr. More preferably the metal is Ca or Zr.

Examples of suitable cobalt (Co) salts of an organic acid include, but are not limited to: cobalt carboxylates such as cobalt neodecanoates, cobalt isononate, cobalt tallates, cobalt linoleates, cobalt octoates, cobalt naphthenates, and cobalt boroacylates. Such cobalt (Co) driers are available from the OM Group, Inc., and include cobalt Ten-Cem®, cobalt Cem-All®, cobalt Hex-Cem®, cobalt Nap-All, Cobalt Lin-All®, and Ultra-Dri® 360D.

Examples of suitable calcium (Ca) salts of an organic acid include, but are not limited to: calcium carboxylates such as calcium neodecanoates, calcium octoates, calcium tallates, calcium linoleates, and calcium naphthenates. Such calcium (Ca) driers are available from the OM Group, Inc., and include calcium Ten-Cem®, calcium Cem-All®, calcium Hex-Cem®, and calcium Nap-All.

Examples of suitable zirconium (Zr) salts of an organic acid include, but are not limited to: zirconium carboxylates such as zirconium propionate, zirconium neodecanoates, zirconium octoates, and zirconium naphthenates and mixtures thereof. Such zirconium (Zr) driers are available from the OM Group, Inc., and include zirconium Hex-Cem®.

Examples of suitable strontium (Sr) salts of an organic acid include, but are not limited to: strontium carboxylates such as strontium octoate. Such strontium driers are available from the OM Group, Inc., and include strontium Hex-Cem®.

The present invention also relates to a coating composition, comprising:
a) at least one autoxidizable alkyd based binder; and
b) the drier composition according to the present invention.

In particular, the present invention provides a coating composition comprising:
at least one autoxidizable alkyd based binder; and a drier composition, wherein the drier composition comprises:
a) at least one metal complex comprising a metal and at least one nitrogen donor ligand, wherein the metal is selected from the group consisting of Fe and Mn, and wherein said at least one nitrogen donor ligand is selected from the group comprising monodentate, bidentate, tridentate, tetradentate, pentadentate and hexadentate nitrogen donor ligands; preferably the ligand is selected from tridentate, tetradentate, pentadentate and hexadentate nitrogen donor ligands,
b) at least one K salt of an organic acid; preferably at least one K carboxylate; and
c) optionally at least one other metal salt of an organic acid, wherein the metal is selected from the group comprising Co, Ca, Zr and Sr.

In a preferred embodiment of the invention, the coating composition comprises from 0.0001 wt % to 2 wt % metal, based on binder solids, of said at least one metal complex. In an even more preferred embodiment of the invention, the coating composition comprises from 0.0002 wt % to 1 wt % metal, based on binder solids, of said at least one metal complex. In an even more preferred embodiment of the invention, the coating composition comprises from 0.0003 wt % to 0.3 wt % metal, based on binder solids, of said at least one metal complex.

In a preferred embodiment of the invention, the coating composition comprises from 0.01 wt % to 2 wt % K, based on binder solids, of said at least one K salt of an organic acid. In an even more preferred embodiment of the invention, the coating composition comprises from 0.02 wt % to 1 wt % K, based on binder solids, of said at least one K salt of an organic acid. In an even more preferred embodiment of the invention, the coating composition comprises from 0.05 wt % to 0.5 wt % K, based on binder solids, of said at least one K salt of an organic acid.

In a preferred embodiment of the invention, the coating composition comprises from 0 to 2 wt % metal, based on binder solids, preferably from 0.001 wt % to 2 wt % metal, based on binder solids, of said at least one optional metal salt of an organic acid. In an even more preferred embodiment of the invention, the coating composition comprises from 0.002 wt % to 1 wt % metal, based on binder solids, of said at least one optional metal salt of an organic acid. In an even more preferred embodiment of the invention, the coating composition comprises from 0.003 wt % to 0.5 wt % metal, based on binder solids, of said at least one optional metal salt of an organic acid, wherein the metal is selected from the group comprising Co, Ca, Zr and Sr.

In a preferred embodiment, the coating composition comprises:
at least one autoxidizable alkyd based binder; and a drier composition, wherein the drier composition comprises:
a) from 0.0001 wt % to 2 wt % metal, based on binder solids, of said at least one metal complex;
b) from 0.01 wt % to 2 wt % K, based on binder solids, of said at least one K salt of an organic acid; and
c) optionally from 0.001 wt % to 2 wt % metal, based on binder solids, of said at least one optional metal salt of an organic acid.

According to the invention, the coating composition comprises at least one autoxidizable alkyd binder.

As used herein, the term "alkyd binder" or "alkyd resin" are used interchangeably. Suitable autoxidizable alkyd resin for use in the invention, are in general the reaction product of the esterification of polyhydric alcohols with polybasic acids (or their anhydrides) and unsaturated fatty acids (or glycerol esters thereof), for example derived from linseed oil, tung oil, tall oil as well as from other drying or semi-drying oils. Alkyd resins are well-known in the art and need not to be further described herein. The properties are primarily determined by the nature and the ratios of the alcohols and acids used and by the degree of condensation. Suitable alkyd resins include long oil and medium oil alkyd resins e.g. derived from 45 to 70 wt % of fatty acids. To improve the performance of the resins, the composition of the long oil and medium oil alkyd may be modified. For example, polyurethane modified alkyds, silicone modified alkyds, styrene modified alkyds, acrylic modified alkyds (e.g. (meth)acrylic modified alkyds), vinylated alkyds, polyamide modified alkyds, and epoxy modified alkyds or mixtures thereof are also suitable alkyd resins to be used in the present composition.

Preferably, said at least one autoxidizable alkyd binder is selected from a medium or long oil unmodified alkyd, a silicone modified alkyd, a polyurethane modified alkyd or a combination thereof. Most preferably, said alkyd binder is a long oil (unmodified) alkyd, a silicone modified alkyd, a polyurethane modified alkyd or a combination thereof.

The amount of alkyd binder in the present compositions can typically range from about 20 to 98 wt %, such as about 30 to about 90 wt %, preferably about 35 to 70 wt % based on the total weight of the composition.

In a preferred embodiment, the coating composition comprises:
at least one autoxidizable alkyd based binder in an amount ranging from about 20 to 98 wt % based on the total weight of the composition, preferably from about 30 to about 90 wt %, more preferably from about 35 to 70 wt % based on the total weight of the composition;
and a drier composition, wherein the drier composition comprises:
a) from 0.0001 wt % to 2 wt % metal, based on binder solids, of said at least one metal complex; preferably from 0.0002 wt % to 1 wt % metal, more preferably from 0.0003 wt % to 0.3 wt % metal, based on binder solids;
b) from 0.01 wt % to 2 wt % K, based on binder solids, of said at least one K salt of an organic acid; preferably from 0.02 wt % to 1 wt % K, more preferably from 0.05 wt % to 0.5 wt % of K, based on binder solids, and
c) optionally from 0.001 wt % to 2 wt % metal, based on binder solids, of said at least one optional metal salt of an organic acid; preferably from 0.002 wt % to 1 wt % metal, more preferably from 0.003 wt % to 0.5 wt % of metal, based on binder solids.

In an embodiment, the coating composition is a solvent-borne coating composition.

As used herein, the term "solvent-borne coating composition" refers to a composition that utilizes one or more volatile organic materials as the primary dispersing medium. According to certain embodiments, the coating compositions of the present invention can be substantially free of water, or, in some cases, completely free of water.

As used herein, the term "volatile organic material" refers to any organic compound having an initial boiling point less than or equal to 250° C. measured at a standard pressure of 101.3 kPa.

As used herein, the term "organic compound" refers to any compound containing at least the element carbon and one or more of hydrogen, oxygen, sulfur, phosphorus, silicon, nitrogen, or a halogen, with the exception of carbon oxides and inorganic carbonates and bicarbonates.

Volatile organic materials are often included in coating compositions to reduce the viscosity of the composition sufficiently to enable forces available in simple coating techniques, such as spraying, to spread the coating to controllable, desired and uniform thicknesses. Also, volatile organic materials may assist in substrate wetting, resinous component compatibility, package stability and film formation. Non-limiting examples of suitable volatile organic materials (also referred as solvent) for use in the present composition include aliphatic, cycloaliphatic, aromatic hydrocarbons and oxygenated solvents, such as hexane, heptane, octane, isooctane, cyclohexane, cycloheptane, toluene and xylene; isoparafins; ketones, such as methyl ethyl ketone and methyl isobutyl ketone; alcohols, such as isopropyl alcohol, normal-butyl alcohol and normal-propyl alcohol; monoethers of glycols, such as the monoethers of ethylene glycol and diethylene glycol; monoether glycol acetates, such as 2-ethoxyethyl acetate; as well as compatible mixtures thereof. As examples of such solvents may be mentioned hydrocarbon solvents available under the trademarks Shellsol H, Shellsol K, Shellsol D40, Shellsol D60, Shellsol D70, and Shellsol AB, all from Shell Chemicals, the Netherlands, the trademarked Solvesso 150 solvent from Esso and also: Exxsol D40, Exxsol D60 and Exxsol D80, and solvents such as ethyl diglycol, ethyl glycol acetate, butyl glycol, butyl glycol acetate, butyl diglycol, butyl diglycol acetate, and methoxypropylene glycol acetate.

As used herein, the term "substantially free" means that the material being discussed is present in the composition, if at all, as an incidental impurity. In other words, the material does not affect the properties of the composition. As used herein, the term "completely free" means that the material being discussed is not present in the composition at all.

In certain embodiments, the amount of water present in the coating compositions of the present invention is less than 25 wt %, such as less than 20 wt %, such as less than 15 wt %, such as less than 10 wt %, such as less than 5 wt %, or, in some cases, less than 2 wt %, or, in yet other cases, less than 1 wt %, with the wt % being based on the total weight of the coating composition. The amount of water should remain lower than 25 wt % such that the alkyd binder remains in the continuous phase.

In a preferred embodiment, the coating composition further comprises at least one solvent in an amounts of about 1 wt % to about 50 wt %, preferably about 2 wt % to about 30 wt %, preferably about 3 wt % to about 20 wt %, based on the total weight of the coating composition.

In certain embodiments, the coating composition of the present invention further comprises anti-skinning agents and anti-oxidants such as but not limited to methyl ethyl ketoxime, n-butyl ketoxime, cyclohexane ketoxime, methyl isobutyl ketoxime, di-methyl ketoxime, 2-cyclohexylphenol, 4-cyclohexylphenol, mono-tertiary butylhydroquinone, diethyl hydroxylamine, 2-[(1-methylpropyl)amino]ethanol, and 2,4-pentadione and the like.

In certain embodiments, the coating compositions of the present invention comprise at least one colorant. The colorant component of the coating composition may comprise one or more inorganic or organic, transparent or non-transparent pigments. Non-limiting examples of such pigments are titanium dioxide, iron oxides, mixed metal oxides, bismuth vanadate, chromium oxide green, ultramarine blue, carbon black, lampblack, monoazo and disazo pigments, anthraquinones, isoindolinones, isoindolines, quinophthalones, phthalocyanine blues and greens, dioxazines, quinacridones and diketo-pyrrolopyrroles; and extender pigments including ground and crystalline silica, barium sulfate, magnesium silicate, calcium silicate, mica, micaceous iron oxide, calcium carbonate, zinc oxide, aluminum hydroxide, aluminum silicate and aluminum silicate, gypsum, feldspar, talcum, kaolin, and the like. The amount of pigment that is used to form the coating composition is understood to vary, depending on the particular composition application, and can be zero when a clear composition is desired.

For example, a coating composition may comprise up to about 300 wt %, for example about 50 to about 200 wt % of pigment based on the solids content of the alkyd resin (pigment/binder), preferably up to 100 wt % of pigment based on the solids content of the alkyd resin. Depending on the particular end use, a preferred composition may comprise approximately 0 to 100 wt % of pigment based on the solids content of the alkyd resin.

The coating compositions of the present invention may include other additives, e.g. catalysts, other pigments and pigment pastes, dyes, fillers, stabilizers, wetting agents, thixotropic agents, anti-sagging agents, anti-oxidants, anti-fouling agents, bactericides, fungicides, algaecides, anti-settling agents, insecticides, antifoaming agents, slip agents, flow and leveling agents, rheological modifiers, photo-initiators, UV-absorbers, HALS-radical scavengers, corrosion inhibitors, matting agents, waxes, mineral oils, flame retardants, anti-static agents, loss of dry inhibitors, optical brighteners, adhesion promoters, diluents, elastomers, plasticizers, air release agents, absorbents, anti-crater additives, reinforcing agents, dispersing aids, plasticizers, substrate wetting agents, odorants, electroconductive additives, corrosion inhibitors and corrosion-inhibitive pigments, additional hardeners and additional curable compounds, depending on the application. Certain embodiments of the coating compositions of the present invention include surface active agents, such as any of the well known anionic, cationic or nonionic surfactants or dispersing agents. Examples of suitable additives that may be added to the coating composition may be found in Additives Guide, Paint & Coatings Magazine, May 2006, hereby incorporated by reference. If desired, other resinous materials can be utilized in conjunction with the aforementioned alkyd resins.

The metal drier combinations and optionally colorants, pigments and extenders and optionally other additives may be formulated into the coating compositions by mixing and, if appropriate, dispersing and grinding with the liquid binder.

In certain embodiments of the invention, the coating composition of the present invention further comprises at least one complexing agent or neutral ligand as a drying accelerator. Suitable complexing agents include but are not limited to 2,2-bipyridyl, imidazoles, pyrazoles, aliphatic and aromatic amines, 1,10-phenanthroline, 5-methyl-1,10-phenanthroline, and the like.

The coating composition according to the invention can be used and/or formulated as varnish, lacquer, paint, stain, enamel, printing ink or floor covering and similar compositions which contain autoxidizable alkyd binders.

The coating compositions of the present invention can be applied to various substrates including wood, paper, foam, and synthetic materials (such as plastics including elastomeric substrates), leather, textiles, glass, ceramic, metals (such as iron, steel and aluminum), concrete, cement, brick, and the like.

As a result, the present invention is also directed to substrates at least partially coated with at least one coating composition of the present invention. The substrates may be pretreated before application of the at least one coating composition. The substrates may be post-treated after application of the at least one coating composition, with any other compositions.

Any known method can be used to apply the coating compositions of the invention to a substrate. Non-limiting examples of such application methods are spreading (e.g., with paint pad or doctor blade, or by brushing or rolling), spraying (e.g., air-fed spray, airless spray, hot spray, and electrostatic spray), flow coating (e.g., dipping, curtain coating, roller coating, and reverse roller coating), and electrodeposition. (See generally, R. Lambourne, Editor, Paint and Surface Coating: Theory and Practice, Eilis Horwood, 1987, page 39 et seq.).

The coating compositions of the present invention can be applied and fully cured at ambient temperature conditions in the range of from about −10° C. to 50° C. Curing of said polymer composition according to the invention typically can proceed very rapidly, and in general can take place at a temperature within the range of from −10° C. to +50° C., in particular from 0° C. to 40° C., more in particular from 3 to 25° C. However, compositions of the present invention may be cured by additional heating.

The coating compositions of the present invention may be used as a single coating, a top coating, a base coating in a two-layered system, or one or more layers of a multi-layered system including a clear top coating composition, colorant layer and base coating composition, or as a primer layer. A typical opaque system may comprise: 1 or 2 layers primer and 1 or 2 layers of top coat (a total of 3 layers). Alternative opaque system may comprise: 1 primer layer, 1 layer of mid coat and 1 layer top coat. Example of transparent systems may comprise 1 layer of impregnant and 3 layers of top coats or 3 layers of top coat for maintenance work.

The invention will be more readily understood by reference to the following examples, which are included merely for purpose of illustration of certain aspects and embodiments of the present invention and are not intended to limit the invention.

EXAMPLES

Four examples are described hereunder illustrating the effect of the compositions according to embodiments of the present invention on the drying.

Unless otherwise indicated, all parts and all percentages in the following examples, as well as throughout the specification, are parts by weight or percentages by weight respectively.

The following test methods were used to evaluate the films and coatings prepared according to the invention.

The drying stages of the paint formulations were assessed using a BK-drying recorder (Sheen Instruments Ltd). A wet paint layer was cast on a glass strip 30.5×2.5 cm by using a sheen cube with a gap size of 150 μm. A vertical blunt needle was positioned into the freshly applied film loaded by 5 g of brass and then dragged through the drying paint at a speed of 24.4 mm/h in a direction parallel to the length of the coat. A freshly applied alkyd coating was a viscous liquid and the needle penetrated through the coating onto the glass plate and created a score. As the physical drying and autoxidation of the alkyd coating progressed, the viscosity of the drying film rose and the resistance to penetration by the needle increased. During the drying process, the needle created a typical pattern and the various drying stages could be read off from the scribed pattern.

The drying times were determined in terms of four stages, defined as follows:

Run back: the film flows back together when the stylus moves through it and no groove is formed. This phase is characterized by the evaporation of the solvent from the paint.

Continuous track: the film is starting to set up. It does not flow back together after the stylus moves through it, bringing about a groove in the film. In this stage, the viscosity of the paint film has substantially increased. This phase ends when the point of "start of gel tear" is reached.

Gel tear: The stylus rips the surface skin of the film. The film is starting to surface dry but is not through dry.

Surface trace: The stylus leaves a mark on the surface of the film. The phase is characterized by that the film is starting to through dry. At the end of this phase, the resistance becomes total and no further penetration occurs. The alkyd film has reached the status of "through dry".

Drying times were also assessed in the following manner. The test composition was cast on a glass plate by using a draw bar with a gap size of 100 μm.

Dust-free: The coating is considered dust-free if it does not pull fibers when a wad of cotton is blown gently of a drying film in a horizontal direction.

Tack-free: The coating is considered tack free if it does not pull fibers when a wad of cotton is placed on the drying film with a load of 1 kg/3 cm$^2$ for 10 seconds and afterwards blown gently away in a horizontal direction.

Through-dry: The coating is considered through dry if it is not affected pressing and twisting by the thumb with a load of 7 kg on the surface of the film.

Example 1

An enamel was prepared by mixing together the constituents listed in Table 1 with a drier composition according to the invention or with a comparative drier composition.

TABLE 1

| Constituents | Parts by weight |
| --- | --- |
| long oil alkyd (85% non-volatile material (nvm)) | 47.8 |
| thixotropic alkyd (65% nvm) | 15.7 |
| anti-skinning agent | 0.4 |
| defoamer | 0.2 |

TABLE 1-continued

| Constituents | Parts by weight |
| --- | --- |
| high boiling aliphatic hydrocarbon solvent | 7.5 |
| white alkyd colorant | 17.7 |
| black alkyd colorant | 10.7 |
| total | 100.0 |

To portions of the enamel were added a drier composition according to an embodiment of this invention or a comparative drier composition. In this example, the iron-complex based Borchi OXY-Coat was combined with a series of primary, secondary and auxiliary driers. A regular drier combination of cobalt, zirconium and calcium was included as comparative example. The test compositions were aged overnight before the drying performance was evaluated. The results are shown in Table 2.

TABLE 2

| | Example 1 | Comparative example 2 | Comparative example 3 | Comparative example 4 | Comparative example 5 | Comparative example 6 | Comparative example 7 |
| --- | --- | --- | --- | --- | --- | --- | --- |
| | | | | Parts by weight | | | |
| base paint | 100 | 100 | 100 | 100 | 100 | 100 | 100 |
| Borchi OXY-Coat | 0.46 | 0.46 | 0.46 | 0.46 | 0.46 | 0.46 | 0.46 |
| potassium (15%) drier | 0.76 | | | | | | |
| zirconium (18) drier | | | 1.75 | | | | |
| calcium (10%) drier | | | | 1.09 | | | |
| cobalt (10%) drier | | | | | 0.14 | | |
| manganese (10%) drier | | | | | | 0.27 | |
| cerium (10%) drier | | | | | | | 0.27 |
| neodymium (12%) drier | | | | | | | |
| barium (12.5%) drier | | | | | | | |
| copper (8%) drier | | | | | | | |
| lithium (2%) drier | | | | | | | |
| zinc (10%) drier | | | | | | | |
| | drying times (hours:minutes) at 23° C./50% RH | | | | | | |
| run back | 3:00 | 7:30 | 5:10 | 5:00 | 4:10 | 10:00 | 9:00 |
| start of gel tear | 3:00 | 8:55 | 5:50 | 5:00 | 4:30 | 10:00 | 9:55 |
| end of gel tear | 17:30 | >24:00 | >24:00 | >24:00 | >24:00 | >24:00 | >24:00 |
| end of surface trace | 17:30 | >24:00 | >24:00 | >24:00 | >24:00 | >24:00 | >24:00 |

| | Comparative example 8 | Comparative example 9 | Comparative example 10 | Comparative example 11 | Comparative example 12 | Comparative example 13 |
| --- | --- | --- | --- | --- | --- | --- |
| | | | Parts by weight | | | |
| base paint | 100 | 100 | 100 | 100 | 100 | 100 |
| Borchi OXY-Coat | 0.46 | 0.46 | 0.46 | 0.46 | 0.46 | |
| potassium (15%) drier | | | | | | |
| zirconium (18) drier | | | | | | 3.51 |
| calcium (10%) drier | | | | | | 2.19 |
| cobalt (10%) drier | | | | | | 0.27 |
| manganese (10%) drier | | | | | | |
| cerium (10%) drier | | | | | | |
| neodymium (12%) drier | 0.95 | | | | | |
| barium (12.5%) drier | | 0.92 | | | | |
| copper (8%) drier | | | 1.42 | | | |
| lithium (2%) drier | | | | 5.71 | | |
| zinc (10%) drier | | | | | 1.14 | |
| | drying times (hours:minutes) at 23° C./50% RH | | | | | |
| run back | 5:10 | 5:00 | 4:55 | 3:00 | 6:50 | 2:05 |
| start of gel tear | 5:10 | 5:00 | 4:55 | 3:00 | 9:35 | 2:05 |
| end of gel tear | >24:00 | >24:00 | >24:00 | >24:00 | >24:00 | >24:00 |
| end of surface trace | >24:00 | >24:00 | >24:00 | >24:00 | >24:00 | >24:00 |

The data in table 2 demonstrate that the coating composition and the drier composition according to an embodiment of this invention was far more effective in both the surface drying and the through drying compared to the performance of Borchi Oxy-Coat as sole drier as shown in comparative example 2 or Borchi-OXY Coat combined with a series of primary, secondary and auxiliary driers as shown in the comparative example 3-12. The metal driers Zr, Ca, Co, Nd, Ba, Cu and Li also improved the surface drying properties of Borchi Oxy-Coat to a certain extent, but none of these metal driers has the same positive effect on the through drying as K-carboxylate. The addition of Li-carboxylate to Borchi-OXY Coat induced the same reduction in surface drying time as K-carboxylate but did not improve the through drying of the formulation. Li and K are in the same group of the periodic table. The surface drying performance of the drier composition according to this invention came close to that of a regular drier combination of cobalt, zirconium and calcium but the through drying was even superior over this combination as is presented in comparative example 13.

Example 2

A white gloss enamel was prepared by grinding in a bead mill and mixing the constituents together as listed in Table 3.

TABLE 3

| Constituents | Parts by weight |
| --- | --- |
| long oil alkyd (80% nvm) | 50.0 |
| thixotropic alkyd (65% nvm) | 15.0 |
| defoamer | 0.2 |
| dispersant | 1.2 |
| titanium dioxide | 25.5 |
| high boiling aliphatic hydrocarbon solvent | 7.7 |
| anti-skinning agent | 0.4 |
| total | 100.0 |

To portions of the base paint were added either a drier system of this invention or a comparative drier system. The test compositions were aged overnight before the drying performance was evaluated. The results are shown in Table 4.

TABLE 4

| | Example 14 | Comparative example 15 | Comparative example 16 | Comparative example 17 |
| --- | --- | --- | --- | --- |
| | Parts by weight | | | |
| base paint | 100 | 100 | 100 | 100 |
| Borchi OXY-Coat | 0.46 | 0.46 | 0.46 | |
| potassium (15%) drier | 1.55 | | | |
| zirconium (18) drier | | | 1.33 | 1.33 |
| calcium (10%) drier | | | 2.20 | 2.20 |
| cobalt (10%) drier | | | | 0.37 |
| drying times (hours:minutes) at 5° C./85% RH | | | | |
| run back | 1:35 | 2:35 | 3:00 | 2:00 |
| start of gel tear | 1:50 | 8:30 | 5:35 | 6:30 |
| end of gel tear | 17:30 | 15:00 | 15:15 | 15:10 |
| end of surface trace | 17:30 | 15:00 | 15:15 | >24:00 |

From the data in Table 4 it can be seen that the addition of K-carboxylate to Borchi-OXY Coat resulted in an improvement of the surface drying at low temperatures. Under these climatic conditions the surface drying of the K-carboxylate and Borchi-OXY Coat containing formulation was even faster than the regular combination of Co—Zr—Ca-driers which is acknowledged for its good drying performance under adverse conditions.

Example 3

A typical base paint without metal driers was prepared by grinding in a bead mill and mixing together the constituents listed in Table 5.

TABLE 5

| Constituents | Parts by weight |
| --- | --- |
| long oil alkyd (85% nvm) | 36.2 |
| defoamer | 0.2 |
| rheology modifier | 0.2 |
| dispersant | 0.4 |
| nepheline syenite | 28.0 |
| anti-skinning agent | 1.9 |
| high boiling aliphatic hydrocarbon solvent | 9.0 |
| white alkyd colorant | 15.8 |
| black alkyd colorant | 9.3 |
| total | 100.0 |

To portions of the base paint were added: either a drier composition of this invention based on an iron- or a manganese-ligand complex and potassium carboxylate or a comparative drier system.

The test compositions were aged overnight before the drying performance was evaluated. The results are shown in Table 6.

TABLE 6

| | Example 18 | Comparative example 19 | Example 20 | Comparative example 21 |
| --- | --- | --- | --- | --- |
| | Parts by weight | | | |
| base paint | 100 | 100 | 100 | 100 |
| Borchi OXY-Coat | 0.48 | 0.48 | | |
| DryCoat | | | 0.48 | 0.48 |
| potassium (15%) drier | 0.40 | | 0.40 | |
| zirconium (18) drier | 2.45 | 2.45 | 2.45 | 2.45 |
| calcium (10%) drier | 1.27 | 1.27 | 1.27 | 1.27 |
| cobalt (10%) drier | 0.08 | 0.08 | | |
| drying times (hours:minutes) at 5° C./85% RH | | | | |
| run back | 7:15 | 10:30 | 7:00 | 10:30 |
| start of gel tear | 9:30 | 13:45 | 10:30 | 14:45 |
| end of gel tear | 11:00 | 15:15 | 13:30 | 16:15 |
| end of surface trace | 12:00 | 16:00 | 14:45 | 17:00 |

The test results in Table 6 showed that the same positive effect on the drying performance of the addition of K-octoate of the iron-ligand complex based drier was also found for the addition of K-octoate to a manganese-ligand complex based drier (DryCoat).

Example 4

A typical base paint without metal driers was prepared by mixing together the constituents as listed in Table 7.

TABLE 7

| Constituents | Parts by weight |
|---|---|
| PU-modified alkyd binder (75% nvm) | 62.9 |
| defoamer | 0.2 |
| anti-skinning agent | 0.7 |
| high boiling aliphatic hydrocarbon solvent | 3.5 |
| white alkyd colorant | 32.7 |
| total | 100.0 |

To portions of the base paint were added: either a drier composition of this invention based on an iron- or a manganese-ligand complex and potassium carboxylate or a comparative drier system.

The test compositions were aged overnight before the drying performance was evaluated. The results are shown in Table 8.

it had no effect on Co-octoate. Furthermore, K-octoate activated Mn- and Fe-complexed driers especially at low temperatures (5° C.) and a significant reduction in drying time was observed.

What is claimed is:

1. A drier composition for an autoxidizable alkyd based coating composition, comprising:
   a) at least one metal complex comprising a metal and at least one nitrogen donor ligand, wherein the metal is selected from the group consisting of Fe and Mn, and wherein said at least one nitrogen donor ligand comprises one or more monodentate, bidentate, tridentate, tetradentate, pentadentate and/or hexadentate nitrogen donor ligands;
   b) at least one K salt of an organic acid, wherein said organic acid comprises octoic acid, naphthenic acid, neodecanoic acid, 2-ethylhexanoic acid; or a mixture of these acids; and

TABLE 8

| | Example 22 | Comparative example 23 | Example 24 | Comparative example 25 | Example 26 | Comparative example 27 | Comparative example 28 | Comparative example 29 |
|---|---|---|---|---|---|---|---|---|
| | | | | Parts by weight | | | | |
| base paint | 100 | 100 | 100 | 100 | 100 | 100 | 100 | 100 |
| Borchi OXY-Coat | 0.49 | 0.49 | 0.49 | 0.49 | | | | |
| DryCoat | | | | | 0.21 | 0.21 | | |
| potassium (15%) drier | 0.35 | | 0.35 | | 0.35 | | 0.35 | |
| zirconium (18) drier | 2.31 | 2.31 | 2.31 | 2.31 | 2.31 | 2.31 | 2.31 | 2.31 |
| calcium (5%) drier | 2.79 | 2.79 | 2.79 | 2.79 | 2.79 | 2.79 | 2.79 | 2.79 |
| cobalt (10%) drier | | | 0.07 | 0.07 | | | 0.21 | 0.21 |
| | | | drying times (hours:minutes) at 23° C./50% RH | | | | | |
| dust-free | 4:00 | 4:00 | 2:45 | 3:30 | 4:00 | 5:45 | 2:45 | 2:45 |
| tack-free | 5:45 | 6:15 | 3:30 | 4:00 | 5:45 | 7:00 | 3:00 | 3:00 |
| through-dry | 7:00 | 9:00 | 5:00 | 5:45 | 6:45 | 9:00 | 5:00 | 5:00 |

The data in Table 8 showed that the drier composition of this invention (examples 22, 24 and 26) were more effective in the surface drying and the through drying than the comparative drying systems invention (comparative examples 23, 25 and 27). Moreover, the results showed that addition of potassium octoate to the regular drier combination of Co—Zr—Ca-carboxylates has no performance enhancing effect (comparative examples 28 and 29).

The results of these examples also showed that K-octoate boosted the activity of Mn- and Fe-complexed driers, while c) at least one other metal salt of an organic acid, wherein the metal in the at least one other metal salt of an organic acid comprises Co, Ca, Zr and/or Sr.

2. The drier composition according to claim 1, wherein said at least one nitrogen donor ligand comprises one or more of the compounds of formula (I), (II), (III), (IV), (V), (VI), (VII), N-heterocyclic compounds and/or N-heteroaromatics,

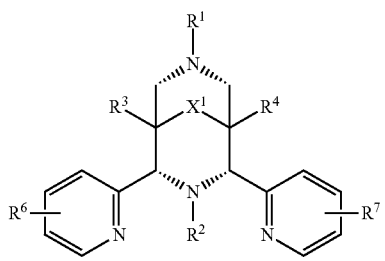 (I)

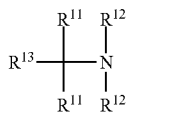 (II)

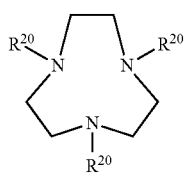 (III)

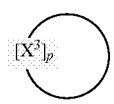 (IV)

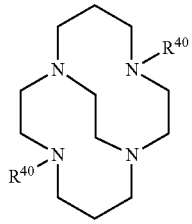 (V)

$(R^{50})_2N-X^4-N(R^{50})_2$; (VI)

$N(R^{60})_3$; (VII)

wherein $R^1$ and $R^2$ are independently $C_{1-24}$alkyl, $C_{6-10}$aryl, heteroaryl, heteroaryl$C_{1-6}$alkyl, and/or —$CH_2$—$CH_2$—N($CH_3$)$_2$, wherein heteroaryl comprises pyridyl, pyrazinyl, pyrazolyl, pyrrolyl, imidazolyl, benzimidazolyl, pyrimidinyl, triazolyl and/or thiazolyl;

$R^3$ and $R^4$ are independently —H, $C_{1-8}$alkyl, $C_{1-8}$alkyl-O—$C_{1-8}$alkyl, $C_{1-8}$alkyl-O—$C_{6-10}$aryl, $C_{6-10}$aryl, $C_{1-8}$hydroxyalkyl, and/or —($CH_2$)$_m$C(O)O$R^5$;

$R^5$ is —H and/or $C_{1-4}$alkyl, m is an integer in the range of 0 to 4;

each $R^6$ and $R^7$ are independently —H, —F, —Cl, —Br, —OH, $C_{1-4}$alkoxy, —NH—C(O)—H, —NH—C(O)—$C_{1-4}$alkyl, —NH$_2$, —NH—$C_{1-4}$alkyl, and/or $C_{1-4}$alkyl; and, $X^1$ is —C(O)— or —[C($R^8$)$_2$]$_n$—; wherein n is an integer in the range of 0 to 3, and each $R^8$ is independently —H, —OH, $C_{1-4}$alkoxy and/or $C_{1-4}$alkyl;

$R^{11}$ and $R^{12}$ are each independently a group of formula —$R^{14}$-$R^{15}$;

$R^{13}$ comprises —H, —$R^{14}$-$R^{15}$, and/or an optionally substituted group comprising $C_{1-6}$ alkyl, $C_{6-10}$aryl and/or $C_{6-10}$aryl-$C_{1-6}$alkyl;

each $R^{14}$ is independently a single covalent bond or an optionally substituted group comprising $C_{1-6}$alkylene, $C_{2-6}$alkenylene, $C_{1-6}$oxyalkylene, $C_{1-6}$aminoalkylene, $C_{2-6}$alkylene ether, carboxylic ester and/or carboxylic amide; and, each $R^{15}$ is independently an optionally N-substituted aminoalkyl group and/or an optionally substituted heteroaryl group comprising pyridyl, pyrazinyl, pyrazolyl, pyrrolyl, imidazolyl, benzimidazolyl, pyrimidinyl, triazolyl and/or thiazolyl;

each $R^{20}$ is independently $C_{1-6}$alkyl, $C_{3-8}$cycloalkyl, heterocycloalkyl, heteroaryl, $C_{6-10}$aryl and/or $C_{6-10}$aryl$C_{1-6}$ alkyl, optionally substituted with a substituent comprising —OH, $C_{1-6}$alkoxy, phenoxy, carboxylate, carboxamide, carboxylic ester, sulfonate, amine, and/or $C_{1-6}$alkylamine and —$N^+(R^{21})_3$;

each $R^{21}$ comprises —H, $C_{1-6}$alkyl, $C_{2-6}$alkenyl, $C_{6-10}$aryl-$C_{1-6}$alkyl, $C_{6-10}$aryl-$C_{2-6}$alkenyl, $C_{1-6}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and/or —$CX^2_2$—$R^{22}$;

each $X^2$ is —H or $C_{1-3}$alkyl and wherein each $R^{22}$ independently comprises an optionally substituted heteroaryl group comprising pyridyl, pyrazinyl, pyrazolyl, pyrrolyl, imidazolyl, benzimidazolyl, pyrimidinyl, triazolyl and/or thiazolyl; and, at least one of $R^{21}$ is —$CX^2_2$—$R^{22}$;

each $X^3$ is independently

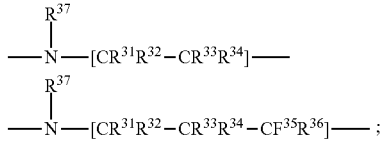

or p is 4;

each $R^{37}$ is independently —H, $C_{1-6}$alkyl, —$CH_2CH_2OH$, pyridin-2-ylmethyl and/or —$CH_2C(O)OH$; and, each $R^{31}$, $R^{32}$, $R^{33}$, $R^{34}$, $R^{35}$ and $R^{36}$ are independently —H, —$C_{1-4}$alkyl and/or $C_{1-4}$-hydroxyalkyl;

wherein each $R^{40}$ is independently —H or an optionally substituted group comprising $C_{1-20}$alkyl, $C_{1-6}$alkyl-$C_{6-10}$ aryl, $C_{2-6}$-alkenyl and/or $C_{2-6}$-alkynyl; and all nitrogen atoms in the macropolycyclic rings are coordinated with the transition metal;

$X^4$ is —$CH_2CH_2$—, —$CH_2CH_2CH_2$—, and/or —$CH_2C(OH)HCH_2$—;

each $R^{50}$ is independently —H, $C_{1-6}$alkyl, $C_{3-8}$cycloalkyl, heterocycloalkyl, heteroaryl, $C_{6-10}$aryl and/or $C_{6-10}$aryl-$C_{1-6}$alkyl, optionally substituted with a substituent comprising —OH, $C_{1-6}$alkoxy, phenoxy, carboxylate, carboxamide, carboxylic ester, sulfonate, amine, $C_{1-6}$alkylamine and/or —$N^+(R^{51})_3$;

each $R^{51}$ comprises —H, $C_{1-6}$alkyl, $C_{2-6}$alkenyl, $C_{6-10}$aryl-$C_{1-6}$alkyl, $C_{6-10}$aryl-$C_{2-6}$alkenyl, $C_{1-6}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and/or $C(X^5)_2$—$R^{52}$;

each $X^5$ is independently —H or $C_{1-3}$alkyl and wherein each $R^{52}$ is independently an optionally substituted heteroaryl group comprising pyridyl, pyrazinyl, pyrazolyl, pyrrolyl, imidazolyl, benzimidazolyl, pyrimidinyl, triazolyl and/or thiazolyl; and, at least two of $R^{50}$ comprise $C(X^5)_2$—$R^{52}$; and each $R^{60}$ is independently —H, $C_{1-6}$alkyl, $C_{6-10}$aryl, $C_{1-6}$alkyl-$C_{6-10}$aryl and/or $C_{2-6}$alkenyl.

3. The drier composition according to claim 1, wherein said at least one nitrogen donor ligand comprises a compound of formula (XI), (XII), (XIII), (XIV), and/or (XV),

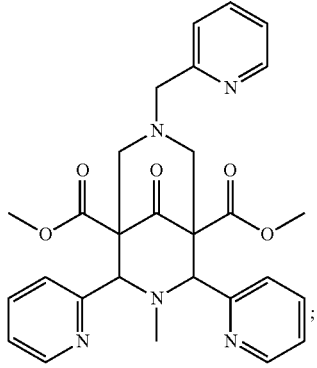
(XI)

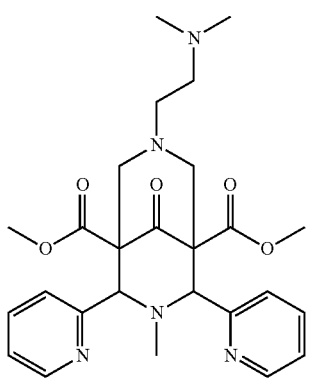
(XII)

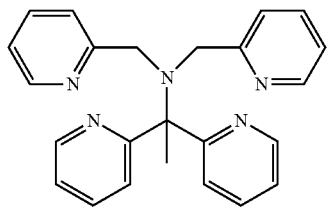
(XII)

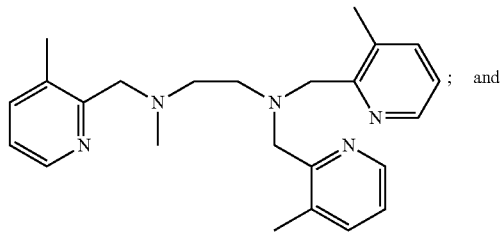
(XIV)

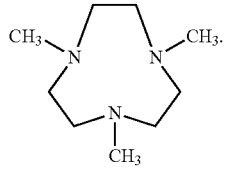
(XV)

4. A coating composition, comprising:
   a) at least one autoxidizable alkyd based binder; and
   b) a drier composition according to claim 1.

5. The coating composition according to claim 4, wherein said at least one autoxidizable alkyd based binder is a medium or long oil unmodified alkyd, a silicone modified alkyd, a polyurethane modified alkyd, or a combination thereof.

6. The coating composition according to claim 4, wherein said at least one autoxidizable alkyd based binder is present in an amount ranging from 20 to 98 wt %, based on the total weight of the composition.

7. The coating composition according to claim 4, wherein said composition is a solvent-borne composition.

8. A method of coating a substrate, comprising applying the coating composition of claim 4 to at least a portion of the substrate.

9. A substrate having applied thereon a coating composition according to claim 4.

10. The method of claim 8, wherein the substrate comprises a floor covering.

11. A method of reducing drying time at 5° C. of an autoxidizable alkyd based coating composition, comprising adding the drier composition of claim 1 to the autoxidizable alkyd based coating composition.

* * * * *